United States Patent
Skelton et al.

(10) Patent No.: US 9,709,036 B2
(45) Date of Patent: Jul. 18, 2017

(54) VEHICLE MOUNTED ELECTRICAL GENERATOR

(71) Applicant: Nemo Ventures, L.L.C., Overland Park, KS (US)

(72) Inventors: Paul E. Skelton, Kansas City, MO (US); Robert S. Cutler, Overland Park, KS (US)

(73) Assignee: NEMO VENTURES, L.L.C., Overland Park, KS (US)

( * ) Notice: Subject to any disclaimer, the term of this patent is extended or adjusted under 35 U.S.C. 154(b) by 0 days.

(21) Appl. No.: 15/253,245

(22) Filed: Aug. 31, 2016

(65) Prior Publication Data

US 2017/0067444 A1    Mar. 9, 2017

Related U.S. Application Data

(60) Provisional application No. 62/216,137, filed on Sep. 9, 2015.

(51) Int. Cl.
| | | |
|---|---|---|
| *G09F 21/04* | (2006.01) | |
| *F03D 9/00* | (2016.01) | |
| *G09F 13/04* | (2006.01) | |
| *F03D 9/25* | (2016.01) | |
| *F03D 9/32* | (2016.01) | |

(52) U.S. Cl.
CPC ............... *F03D 9/002* (2013.01); *F03D 9/25* (2016.05); *F03D 9/32* (2016.05); *G09F 13/04* (2013.01); *G09F 21/04* (2013.01); *F05B 2220/25* (2013.01); *F05B 2220/706* (2013.01); *G09F 2013/044* (2013.01); *G09F 2013/0431* (2013.01); *G09F 2013/0463* (2013.01)

(58) Field of Classification Search
CPC . G09F 21/04; G09F 17/00; F03D 1/04; F03D 13/20; F05B 2240/133
USPC ................................ 40/541, 591; 73/170.06
See application file for complete search history.

(56) References Cited

U.S. PATENT DOCUMENTS

| | | |
|---|---|---|
| 1,579,034 A | 3/1926 | Roberts |
| 1,879,267 A * | 9/1932 | Hurni ......................... B64F 1/18 244/1 R |
| 4,350,899 A * | 9/1982 | Benoit ....................... F03D 9/00 244/33 |
| 4,553,430 A | 11/1985 | Behrens |
| 4,627,278 A | 12/1986 | Soto |
| 4,989,356 A * | 2/1991 | Combs .................... G09F 19/02 2/171 |
| 5,320,061 A | 6/1994 | Laughlin et al. |
| 5,974,711 A | 11/1999 | Tipke |
| 6,086,214 A | 7/2000 | Ridge |

(Continued)

*Primary Examiner* — Shin Kim
(74) *Attorney, Agent, or Firm* — Erickson Kernell IP, LLC

(57) ABSTRACT

A display which can be mounted on the outside of a vehicle includes a generator to generate electricity to power accessories such as a light for illuminating the display. The display may comprise a windsock which is mounted on a support ring surrounding a central hub in which the turbine mounted. The turbine includes an impeller extending on an inlet end of the central hub and a light source electrically connected to the generator and mounted on the central hub and projecting in an opposite direction from the impeller. The windsock is mounted on the support ring in surrounding relationship to the light source. The vehicle mounted wind turbine may power other electronic devices or accessories.

16 Claims, 5 Drawing Sheets

(56) References Cited

U.S. PATENT DOCUMENTS

| | | |
|---|---|---|
| 6,280,804 B1 | 8/2001 | Akridge |
| 6,588,913 B1 | 7/2003 | Huang |
| 6,672,243 B2 | 1/2004 | Seymour et al. |
| 6,923,552 B2 | 8/2005 | Tseng |
| 8,253,265 B2 * | 8/2012 | Glass ........................ F03D 1/04 |
| | | 290/44 |
| 8,296,979 B2 | 10/2012 | Pereira et al. |
| 8,959,992 B1 | 2/2015 | Murdoch et al. |
| 2005/0279403 A1* | 12/2005 | Kube ........................ G09F 19/02 |
| | | 136/244 |
| 2007/0013196 A1* | 1/2007 | Chen ......................... F03D 1/04 |
| | | 290/55 |
| 2008/0048453 A1* | 2/2008 | Amick ................... B82Y 30/00 |
| | | 290/44 |
| 2009/0013571 A1* | 1/2009 | Edmonds ................ G09F 21/04 |
| | | 40/564 |
| 2010/0212199 A1 | 8/2010 | Edmonds |
| 2015/0054286 A1 | 2/2015 | Al-Garni et al. |
| 2015/0096364 A1* | 4/2015 | Di Giovine ........... G01P 13/002 |
| | | 73/170.06 |

* cited by examiner

VEHICLE MOUNTED ELECTRICAL GENERATOR

CROSS-REFERENCE TO RELATED APPLICATIONS

This application claims priority to U.S. Provisional Patent Application No. 62/216,137 filed Sep. 9, 2015, the disclosure of which is hereby incorporated herein, in its entirety, by reference.

BACKGROUND OF THE INVENTION

This invention relates to vehicle mounted electrical generators.

Flags which can be mounted between the window and window frame of a vehicle to show a driver's support for their team have become popular. It is also known to mount windsocks on a vehicle to provide a visual display. At night, these displays are hard to see thus limiting their utility. Previous attempts have been made to illuminate such vehicle mounted displays using battery powered lights mounted on the support for the display. Maintaining charged batteries in such a system then becomes a continuous chore to ensure illumination of the display.

Securely mounting such displays is also a concern. If the window mounted displays fall were to fall off the window when the vehicle is moving, the display would likely be severely damaged and damages to the property of others could occur. Damage to the display might also occur if the display falls off the window while the vehicle is stationary.

SUMMARY OF THE INVENTION

The present invention is directed to a wind turbine which can be mounted on a vehicle to generate electricity to power accessories such as a light for illuminating a display connected to the support structure for the wind turbine. The display may comprise a windsock which is mounted on a support ring surrounding a central hub in which the turbine mounted. The turbine includes an impeller extending on an inlet end of the central hub and a light source electrically connected to the generator and mounted on the central hub and projecting in an opposite direction from the impeller. The windsock is mounted on the support ring in surrounding relationship to the light source. The vehicle mounted wind turbine may power other electronic devices or accessories.

A hook is formed on a lower end of a support post connected to the support ring of the turbine or display for use in securing the turbine or display to a car window. A tether, including a loop positioned around the support post and a suction cup connected to a distal end of the loop may be used to provide a second means for connecting the turbine or display to the car window. If the hook becomes disconnected from the window, the loop should catch the turbine or display by the hook with the suction cup connecting the loop and the turbine or display supported thereby to the window to prevent the turbine or display from falling away from the window.

DETAILED DESCRIPTION OF THE PREFERRED EMBODIMENTS

Figure 1:
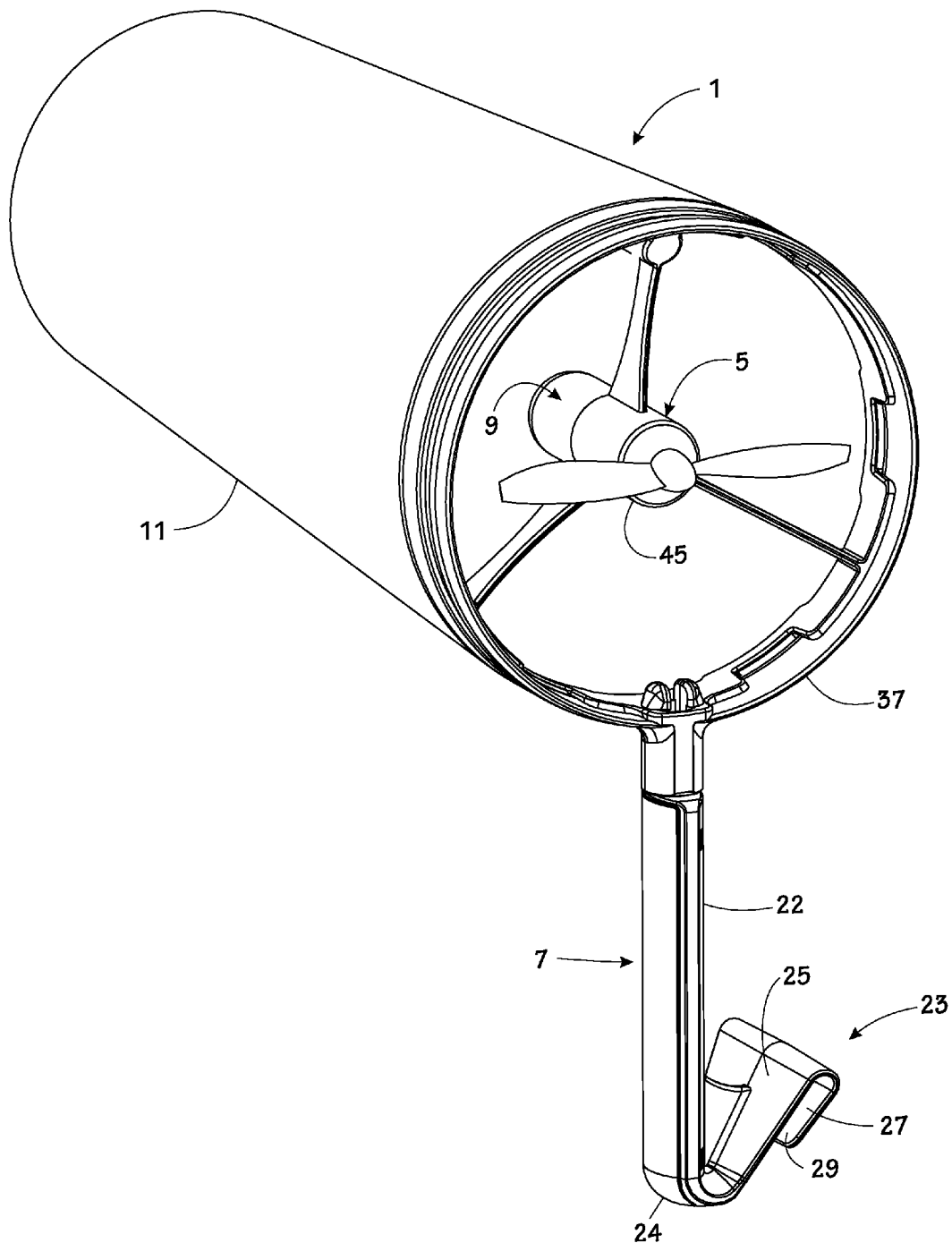
FIG. 1 is a perspective view of an illuminated windsock assembly including a wind turbine for generating electricity to power a light source incorporated in a light assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIG. 1, a windsock assembly 1 for mounting on a vehicle is shown which incorporates a wind turbine 5 mounted on a support 7 and operable to power electrical components such as a light assembly 9 for illuminating a windsock 11 of the windsock assembly 1. In the embodiment shown, the support 7 is adapted for securing the assembly between a window and a window frame of a vehicle and supporting the windsock 11 near or above the roof of the vehicle.

The support 7 includes a support post 22 and a hook 23 formed on and projecting upward from a lower end or base 24 of the support post at an acute angle, which in the embodiment shown, is approximately thirty degrees relative to the support post 22. A shank 25 of the hook 23 projects upward and away from the post 22 at the acute angle and a bite 27 of the hook 23 curves back downward generally at the same angle as the shank 25 relative to the post 22. A gap 29 between the bite 27 and shank 25 is sized to snugly receive the pane of the window therebetween with the shank 25 of the hook 23 resting against the exterior surface of the window pane. In the embodiment shown, the bite 27 extends at a slightly greater angle away from the post 22 than the angle of the shank 25 relative to the post 22' so that the gap 29 at the inlet end of the bite 27 is slightly narrower than the distal end where the bite 27 is connected to the shank 25.

The gap 29 at the inlet end may be formed slightly narrower than a pane of glass to which it is to be secured with the hook 23 formed of resilient material to allow it to expand and then clamp back on the pane of glass. The hook 23 may typically be formed relatively wide to provide stable support for the support 7 against the window pane.

Figure 2:
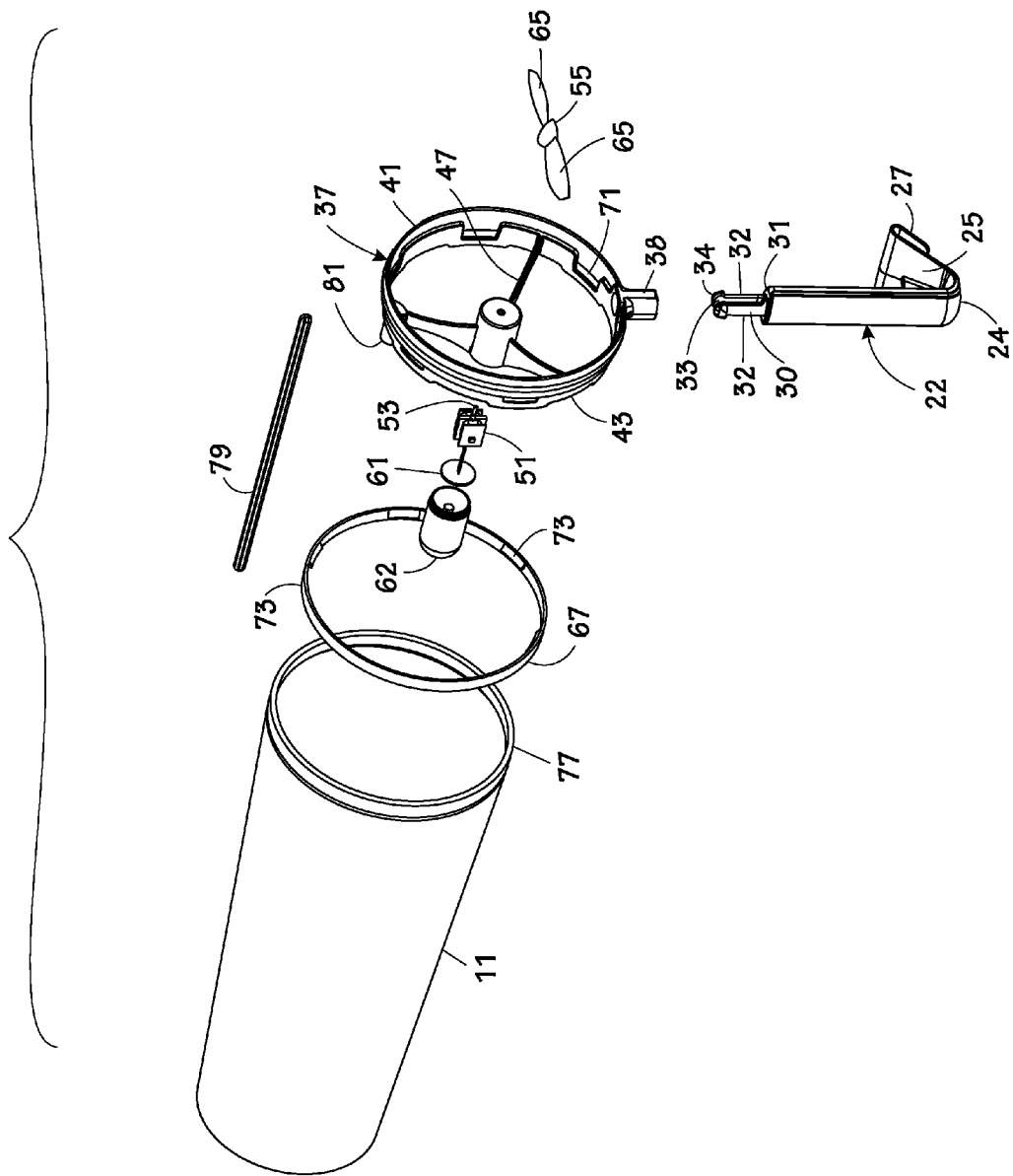
FIG. 2 is an exploded perspective view of an illuminated windsock assembly similar to the embodiment shown in FIG. 1.

As best seen in FIG. 2, a pivot shaft 30 is integrally formed with and projects upward from an upper end of the support post 22. A shoulder 31 is formed at the interface between pivot shaft 30 and support post 22. Shoulder 31 may be formed as a radially outward projecting flange or by forming the support post 22 wider than the pivot shaft 30. In the embodiment shown, the pivot shaft 30 is formed as a snap-fit, compressible, forked shaft including a pair of barbed legs 32 with a slot 33 formed therebetween. Each leg 32 has a rounded outer surface, and an enlarged, outwardly and downwardly sloped head 34 forming a barb 35 projecting outward from the curved outer surface of the leg 32.

Figure 3:
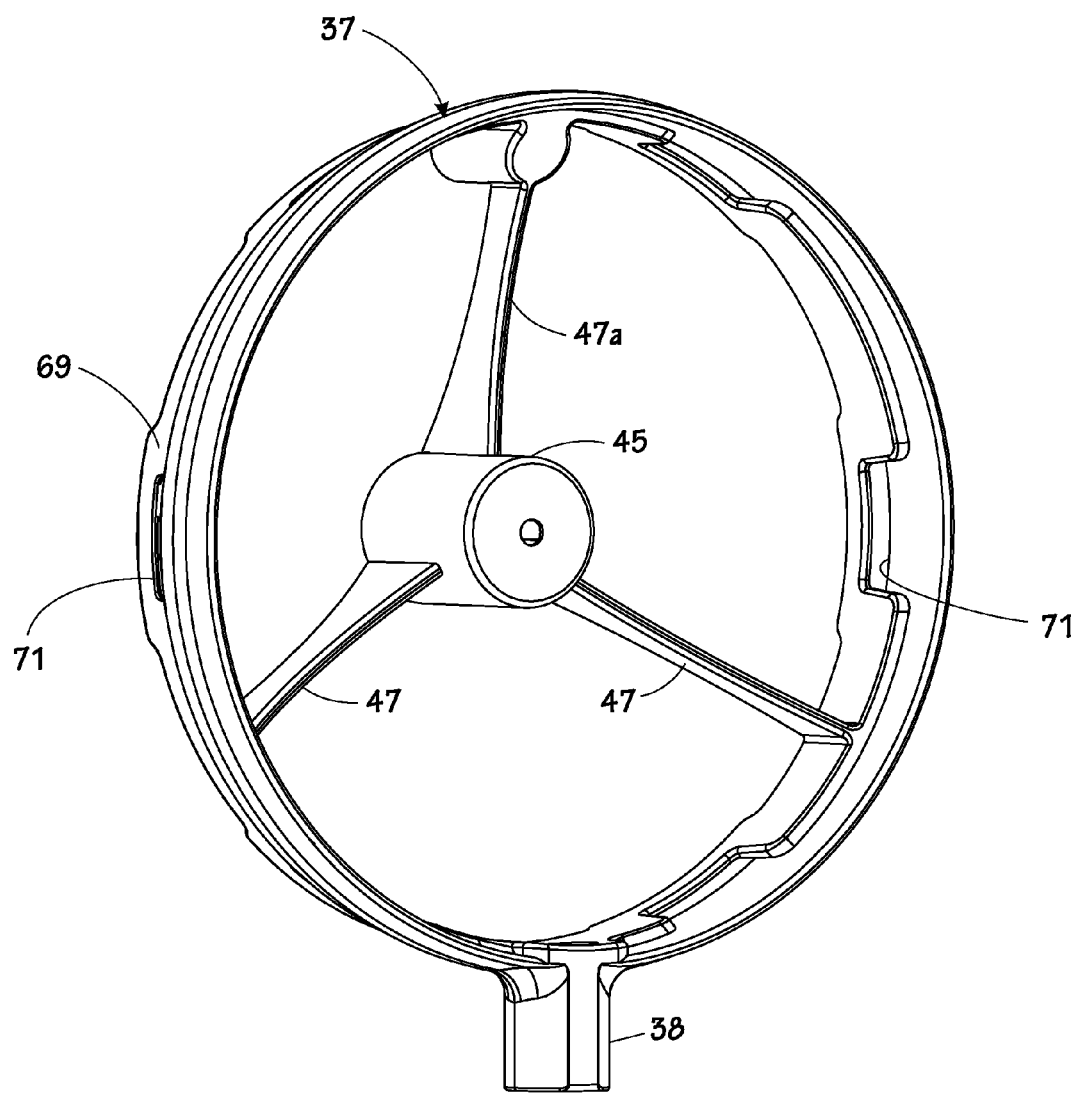
FIG. 3 is an enlarged, perspective view of a support ring of the illuminated windsock assembly as shown in FIG. 2.

A support ring 37, shown separately in FIG. 3, having a pivot sleeve 38 projecting radially outward from a lower edge of the ring 37, is pivotably mounted on pivot shaft 30 with pivot shaft 30 received within sleeve 38. The pivot sleeve 38 is open at both ends including the upper end which opens through the support ring 37. In the embodiment shown, the legs 32 forming the pivot shaft 30, between the shoulder 31 and barbs 35, are slightly longer than the length of pivot sleeve 38 and the barbs 35 extend out slightly wider than the inner diameter of the pivot sleeve 38. The support ring 37 is pivotally mounted on the pivot shaft 30 by aligning the pivot sleeve 38 over the forked pivot shaft 30, then pressing the pivot sleeve 38 downward against the barbs 35 to compress the legs 32 together so that the pivot sleeve 38 slides past the barbs until the sleeve 38 engages the shoulder 31. Once the barbs 35 on legs 32 are advanced past the sleeve 38 the resilient legs 32 bias outward so that the barbs 35 extend over the sleeve 38 to prevent separation of the support ring 37 from the shaft 30 and to pivotally secure the support ring 37 on pivot shaft 30. It is foreseen that other means for pivotally connecting the support ring 37 to the support post 22 could be utilized.

Support ring 37 includes an inlet end 41 and an outlet end 43. Turbine 5 is centrally mounted within support ring 37 in a turbine hub 45 which is connected to the ring 37 by radially extending support arms or fins 47, three of which are shown spaced sixty degrees apart. One of the support arms 47a, extends vertically and generally in planar alignment with the axis of the support post 22 when the support ring 37 is secured to support post 22 and support post 22 is oriented vertically. The turbine 5 includes a generator 51, an impeller shaft 53 and an impeller or rotor 55. The generator 51 is secured within the turbine hub 45 with the impeller shaft extending towards the inlet end 41 of the support ring 37 and through an end wall of the turbine hub 45. The impeller 55 is mounted on the impeller shaft 53 so that the impeller 55 is positioned on the side of the turbine hub 45 closer to the inlet end 41 of ring 37. The generator 51 may be a direct drive generator or may include a gearbox between the impeller shaft and a shaft for the generator to increase or decrease the revolutions per minute between the impeller and the generator.

Figure 4:
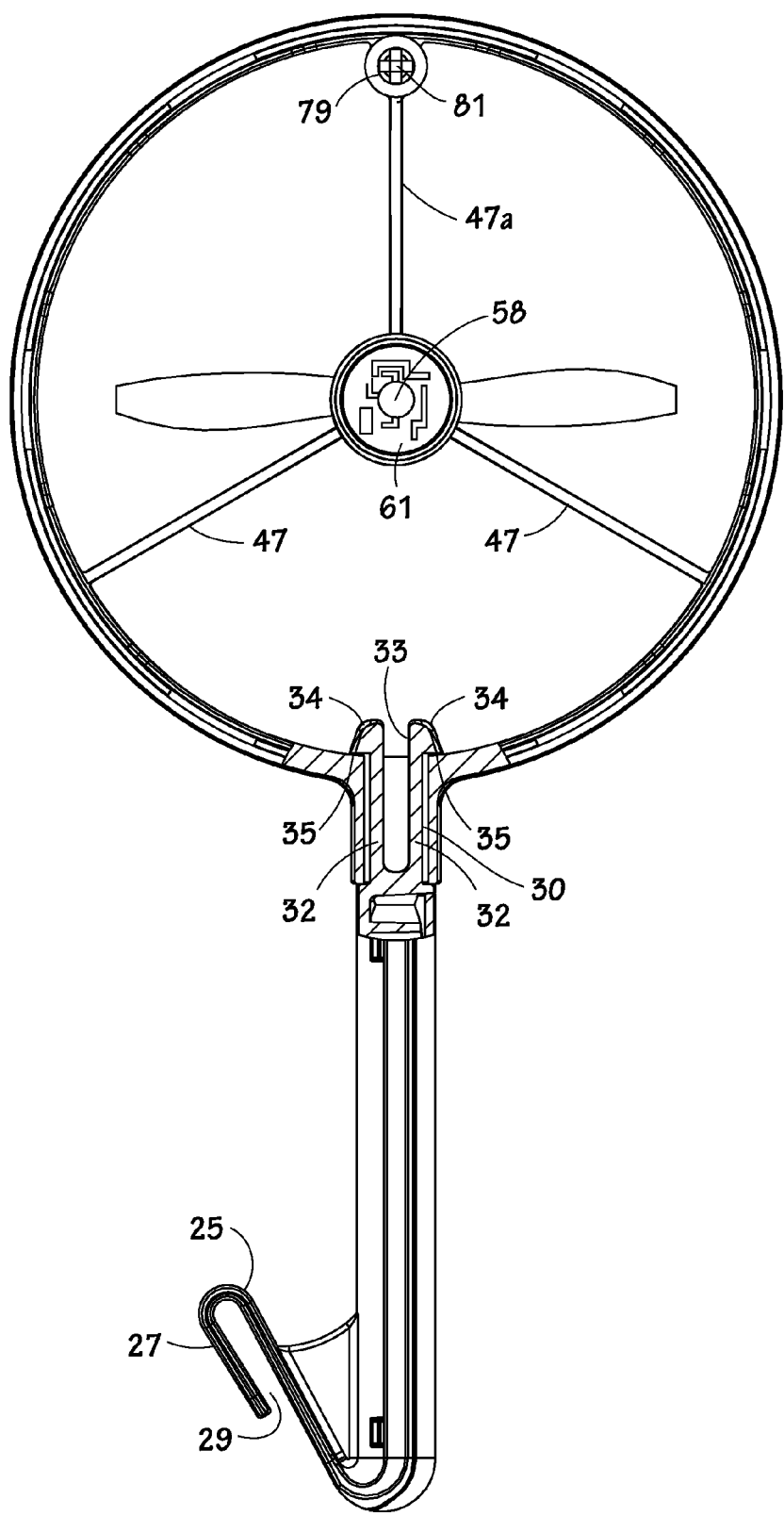
FIG. 4 is a rear, elevational view of the illuminated windsock assembly with a lens for the light assembly removed to show a circuit board and the light source secured in a central hub and with portions broken away to show detail thereof.

Light assembly 9 is connected to the turbine hub 45 on a side opposite impeller 55. As best seen in FIG. 4, light assembly 9 comprises one or more light sources such as light emitting diodes 58 mounted on a circuit board 61 positioned within turbine hub 45. It is to be understood that other light sources, such as incandescent bulbs could be used. The circuit board 61 is mounted in the hub 45 with the light emitting diodes oriented or facing rearward in the opposite direction as the impeller relative to the hub 45. The circuit board 61 and light emitting diodes 58 are electrically coupled to the generator 51 and a transparent, translucent or textured lens 62 shaped to project or diffuse light covers the light sources.

The support arms 47 connecting the turbine hub 45 to the support ring 37 preferably extend rearward relative to the support ring 37 to space the light assembly 9 rearward past the outlet end 43 of ring 37. Rotation of impeller 55 rotates a coil within generator 51 producing electricity which powers the circuit board 61 and light emitting diode 58 of light assembly 57.

Impeller 55 is shown as including two blades 65 extending in opposite directions from impeller shaft 53. Blades 65 are sized such that a small gap extends between ends of the blades 65 and an inner surface of the ring 37. It is foreseen that the impeller 55 could include more than two blades 65.

The windsock 11 is mounted around the outlet end 43 of support ring 37 with the windsock 11 encircling and extending past the light assembly 9. Windsock 11 is shown as a generally cylindrical tube but it is foreseen that the windsock 11 could have other shapes including a frusto-conical shape.

In the embodiment shown, the windsock 11 is connected to the support ring 37 using a mounting ring 67 which interacts with a mounting flange 69 formed on and projecting rearward from support ring 37. Mounting flange 69 includes a plurality of radially spaced slots 71 formed therein with the slots 71 extending arcuately across the mounting flange 69. The mounting ring 67 is formed from a slightly resilient material such as a plastic and has an inner diameter that is slightly greater than the outer diameter of the mounting flange 69. A plurality of inwardly projecting ridges 73 are formed on and project radially inward from an inner surface of the mounting ring 67. Ridges 73 are sized and configured to form an interference fit with the mounting flange 69 when the ridges 73 are passed over and snap into the slots 71. The inner end 77 of windsock 11 is wrapped over the mounting ring 67 and then the mounting ring 67 is slid over the mounting flange 69 until the ridges 73 are advanced into alignment with slots 71 and snap therein trapping the windsock 11 between the mounting flange 69 and mounting ring 67. It is foreseen that other means for securing the windsock to the support ring might include clips or an elastic band.

A support rod 79 may be connected to the vertical fin 47a near an outer end thereof generally adjacent support ring 37 and extending rearward therefrom, away from the inlet end 41 of support ring 37. Support rod 79 is preferably a little shorter than the windsock 11 and functions to support the windsock 11 in a generally horizontally extending alignment when the vehicle on which the assembly 1 is mounted is not moving. The support rod 79 may be formed of metal, plastic or fiberglass or other suitable material and received within a socket 81 formed in an outer end of the vertical fin 47a.

The windsock assembly 1 may be mounted on a vehicle with windows by placing the hook 23 over an upper edge of a window pane which is then rolled up so that the hook 23 is firmly captured between the window pane and the window frame of the vehicle. The support post 22 of support 7 is preferably sized to position the windsock 11 near or above the roof of the vehicle on which it is mounted. As the vehicle moves forward, air passes over the blades 65 causing them to rotate which causes the generator 51 to generate electricity to power light assembly 9 to illuminate the surrounding windsock 11.

Figure 5:
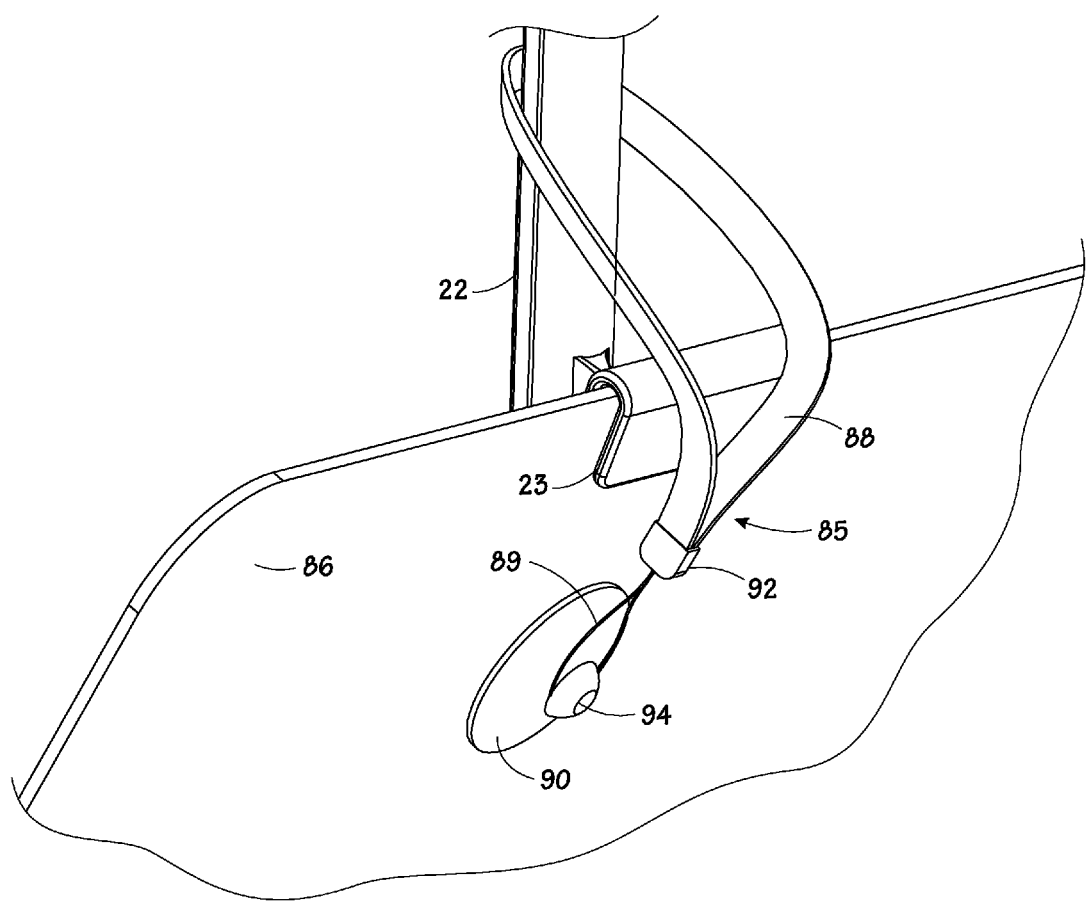
FIG. 5 is a fragmentary perspective view of the illuminated windsock assembly mounted to a vehicle window pane and having a tether connected between a support post of the windsock assembly and the window pane to provide a secondary connection between the windsock assembly and the window pane.

Referring to FIG. 5, a tether 85 is shown for providing a secondary connection between the windsock assembly 1 and the window 86 of the vehicle to which the windsock 1 is secured. The tether 85 includes first and second loops 88 and 89 and a suction cup 90. The suction cup 90 functions as an anchor and is removably securable to a vehicle window 86 or other generally planar surfaces. In the drawings, the suction cup 90 is shown connected to an inside surface of the window 86. The first loop 88 is formed from a flexible or flaccid material such as a woven strap. The second loop 89 may be smaller than the first loop 88 and formed from a flexible or flaccid material such as woven strap or braided cord or a monofilament and will typically be thinner than the material used to form first loop 88. The second loop 89 is also formed smaller in diameter than the first loop 88 (if each are held open in a circle). The second loop 89 may be connected to the first loop 88 by a connector 92 such as an overmolded connector 92. The second loop 88 is secured around a mounting button or post 94 on the back of the suction cup 90.

To use the tether 85, the support post 22 of the windsock assembly 1 is threaded through the first or larger loop 88 before the hook 23 is connected to the window 86. Once the hook 23 is connected to the window 86, the suction cup 90 is adhered to the window 86 to create a secondary connection between the window 86 and the windsock assembly 1 through the suction cup 90 and the first and second loops 88 and 89. If a driver or passenger of the vehicle were to inadvertently roll down the window 86 to which the windsock 1 was connected while the vehicle was moving, the hook 23 would likely disconnect form the window 86. However, as it subsequently fell, the larger loop 88 of the tether 85 should catch the windsock assembly 1 by the hook 23. The suction cup 90, the smaller loop 89 and larger loop 88 then function to maintain the windsock assembly 1 in connection with the window 86 so the windsock assembly 1 does not fall to the ground.

It is foreseen that the generator 51 could be used to power other electrical devices or that electrical outlets or sockets for power supply cords could be incorporated into the structure of the support 7 for supplying power to electrical devices. The electrical device powered by the generator could include a circuit board to allow programmable control of the powered device. For example, the light sources may comprise multiple colored light emitting diodes and the circuit board could be programmed to control a sequence in which the diodes are energized to create varied visual displays of different colored lights. The powered electrical devices may also comprise sound making devices and a remote wireless control may be utilized to control the supply of power to the electrical devices such as lights or sound making devices. It is also foreseen that the electrical devices powered by the generator 51 could include batteries or capacitors for power storage when the vehicle is not moving.

It is to be understood that while certain forms of the present invention have been illustrated and described herein, it is not to be limited to the specific forms or arrangement of parts described and shown. For example, it is foreseen that mounting structure other than a hook could be used to secure the assembly 1 to a vehicle, including suction cups, magnets or clamps for clamping onto structure on the vehicle such as luggage racks. The support structure might also be adapted to support flags instead of a windsock or other displays which may include lights with power supplied by the generator 51.

What is claimed is:

1. An electricity generating vehicle display comprising:
   a support removably securable at a first end to a vehicle;
   a windsock support ring mounted on a second end of said support;
   a windsock connected to the windsock support ring;
   a hub supported centrally relative to said windsock support ring;
   a generator connected to the hub and having a shaft extending forward of the hub;
   an impeller connected to the shaft on an end opposite the generator.

2. The electricity generating vehicle display as in claim 1 further comprising:
   a light source, electrically connected to the generator and oriented to illuminate the windsock.

3. The electricity generating vehicle display as in claim 1 further comprising:
   a tether having a loop of flexible material connected to a suction cup, the loop of flexible material securable around the support.

4. The electricity generating vehicle display as in claim 1 wherein said hub is supported centrally relative to said windsock support ring by at least one support arm.

5. The electricity generating vehicle display as in claim 4 wherein said at least one support arm extends vertically relative to said support ring and a windsock support rod is connected to and projects rearward from said vertically extending support arm.

6. The electricity generating vehicle display as in claim 1 wherein said windsock support ring is pivotally mounted on said support.

7. The electricity generating vehicle display as in claim 6 wherein said windsock support ring is pivotal about a vertical axis through said windsock support ring.

8. The electricity generating vehicle display as in claim 1 wherein said support comprises a support post with a hook formed on said first end thereof, the hook removably securable to an upper edge of a vehicle window pane with said support post extending vertically relative to the vehicle.

9. The electricity generating vehicle display as in claim 2 wherein said light source is connected to said hub.

10. An electricity generating vehicle display comprising:
    a support post removably securable at a first end to a vehicle;
    a windsock support ring pivotally mounted on a second end of said support post;
    a windsock connected to the windsock support ring;
    a hub supported centrally relative to said windsock support ring by at least one support arm extending therebetween;
    a generator connected to the hub and having a shaft extending forward of the hub;
    an impeller connected to the shaft on an end opposite the generator; and
    a light source, electrically connected to the generator and oriented to direct light within the windsock.

11. The electricity generating vehicle display as in claim 10 further comprising:
    a tether having a loop of flexible material connected to a suction cup, the loop of flexible material securable around the support post.

12. The electricity generating vehicle display as in claim 10 wherein said at least one support arm extends vertically relative to said support ring and a windsock support rod is connected to and projects rearward from said vertically extending support arm.

13. The electricity generating vehicle display as in claim 10 wherein said support comprises a support post with a hook formed on said first end thereof, the hook removably securable to an upper edge of a vehicle window pane with said support post extending vertically relative to the vehicle.

14. The electricity generating vehicle display as in claim 13 wherein said light source is connected to said hub.

15. An electricity generating vehicle display comprising:
- a support post having a hook on a lower end thereof for removably connecting to an upper edge of a vehicle window pane such that said support post extends upward relative to the vehicle;
- a display connected to said support post;
- a generator mount connected to said support post;
- a generator connected to the generator mount and having a shaft extending forward of the generator mount;
- an impeller connected to the shaft on an end opposite the generator; and
- a light source, electrically connected to the generator and oriented to illuminate the display.

16. The electricity generating vehicle display as in claim 15 further comprising:
- a tether having a loop of flexible material connected to a suction cup, the loop of flexible material securable around said support post.

* * * * *